United States Patent
Halpern et al.

(10) Patent No.: US 10,419,530 B2
(45) Date of Patent: Sep. 17, 2019

(54) SYSTEM AND METHODS FOR INTELLIGENT SERVICE FUNCTION PLACEMENT AND AUTOSCALE BASED ON MACHINE LEARNING

(71) Applicant: Telefonaktiebolaget L M Ericsson (publ), Stockholm (SE)

(72) Inventors: Joel Halpern, Leesburg, VA (US); Meral Shirazipour, San Jose, CA (US); Ming Xia, San Jose, CA (US); Heikki Mahkonen, San Jose, CA (US); Ravi Manghirmalani, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 400 days.

(21) Appl. No.: 14/930,546

(22) Filed: Nov. 2, 2015

(65) Prior Publication Data

US 2017/0126792 A1    May 4, 2017

(51) Int. Cl.
*H04L 29/08* (2006.01)
*H04L 12/14* (2006.01)
(Continued)

(52) U.S. Cl.
CPC ........ *H04L 67/1002* (2013.01); *G06F 9/5061* (2013.01); *H04L 41/0896* (2013.01)

(58) Field of Classification Search
CPC ............. H04L 67/1002; H04L 41/0896; G06F 9/5061
See application file for complete search history.

(56) References Cited

U.S. PATENT DOCUMENTS 5,704,012 A    12/1997 Bigus
9,419,916 B2 *  8/2016 Roskind ................ H04L 47/765
(Continued)

FOREIGN PATENT DOCUMENTS

EP    2757474 A2    7/2014
WO    2014143802 A1    9/2014
(Continued)

OTHER PUBLICATIONS

Ericsson Review, "Architecture evolution for automation and network programmability," Nov. 28, 2014, downloaded from the internet at http://www.ericsson.com/res/thecompany/docs/publications/ericsson_review/2014/er-evolved-network-architecture.pdf on Nov. 2, 2015, 11 pages.
(Continued)

*Primary Examiner* — Chris Parry
*Assistant Examiner* — Abderrahmen Chouat
(74) *Attorney, Agent, or Firm* — Nicholson de Vos Webster & Elliott LLP

(57) ABSTRACT

A method implemented by a computing device to optimize resource usage of service function chains (SFCs) in a network using machine learning. The method includes obtaining, from an autoscale machine learning (ML) system associated with a virtual network function (vNF), a suggested adjustment to an amount of resources provisioned for the vNF. The autoscale ML system is trained online using machine learning to predict an amount of resources to be utilized by the vNF. The autoscale ML system is configured to receive as input an amount of resources currently utilized by the vNF and an amount of resources currently available to the vNF, determine using machine learning the suggested adjustment to the amount of resources provisioned for the vNF based on the input, and output the suggested adjustment. The method further includes providing the suggested adjustment to a resource re-allocator component.

18 Claims, 11 Drawing Sheets

(51) Int. Cl.
  *G06F 9/50*   (2006.01)
  *H04L 12/24*  (2006.01)

(56) References Cited

U.S. PATENT DOCUMENTS

| | | |
|---|---|---|
| 2008/0222646 A1 | 9/2008 | Sigal et al. |
| 2015/0295849 A1 | 10/2015 | Xia et al. |
| 2016/0179582 A1* | 6/2016 | Skerry ................. G06F 9/5077 718/1 |

FOREIGN PATENT DOCUMENTS

| | | | |
|---|---|---|---|
| WO | WO 2016146878 A1 * | 9/2016 | |
| WO | WO 2017016758 A1 * | 2/2017 | ............. H04L 41/16 |

OTHER PUBLICATIONS

Halpern, et al., "Service Function Chaining (SFC) Architecture", IETF Network Working Group Internet Draft, draft-ietf-sfc-architecture-11, Jul. 24, 2015, 30 pages.

Kalman, R. E., "A New Approach to Linear Filtering and Prediction Problems," ASME, Journal of Basic Engineering 82 (Series D): 35-45, 1960, transcribed by John Lukesh Jan. 20, 2002, downloaded from the internet at https://www.cs.unc.edu/~welch/kalman/media/pdf/Kalman1960.pdf on Nov. 2, 2015, 12 pages.

Wikipedia, "Kalman filter," Wikimedia Foundation, Inc., Oct. 28, 2015, downloaded from the internet at https://en.wikipedia.org/wiki/Kalman_filter on Nov. 2, 2015, 29 pages.

\* cited by examiner

SYSTEM AND METHODS FOR INTELLIGENT SERVICE FUNCTION PLACEMENT AND AUTOSCALE BASED ON MACHINE LEARNING

FIELD

Embodiments of the invention relate to the field of packet networks, and more specifically, to optimizing resource usage in a network using machine learning techniques.

BACKGROUND

Service chaining differentiates forwarding of traffic flows across a policy-defined ordered set of middle boxes (also commonly referred to as services, inline services, appliances, network functions (or virtual network functions in the case of network function virtualization (NFV)), or service functions (SFs)). Examples of SFs include firewalls, content filters, intrusion detection systems (IDS), deep packet inspection (DPI), network address translation (NAT), content caches, load-balancers, wide area network (WAN) accelerators, multimedia transcoders, and logging/metering/charging/advanced charging applications.

Service chaining requires a classification process to assign traffic to the correct service chain, followed by differentiated forwarding/routing of the traffic flow across the correct set of SFs (e.g., a service function chain (SFC)). The Internet Engineering Task Force (IETF) is developing protocols that will allow more efficient ways to implement SFCs. The IETF is also working on defining a network service header (NSH) that is added to packets to assist with service chaining. Then service function forwarders (SFFs) will create the service function paths (SFP) in the form of an overlay. Such service chaining is applicable to both physical network functions and virtual network functions (vNF).

Network measurement provides a network operator with data that enables the operator to characterize the state of the network, the traffic demands, the actual consumption of network resources, and the performance of the network experienced by end users. The network operator can use this information to optimize the usage of network resources in the network. Network paradigms such as software defined networking (SDN) and network function virtualization (NFV) can be used to achieve a holistic view of network and cloud resources.

The amount of network resources and cloud resources (e.g., central processing unit (CPU) resources, memory, bandwidth, storage) that an SFC utilizes can vary depending on the specific SFs (e.g., vNFs) included in the SFC, the amount of traffic in the network, and other factors. Also, the amount of resources required by an SFC can change over time as circumstances change. Existing solutions for provisioning SFC resources are based on static rules and policies. Static rules and policies usually either over-provision resources (leading to inefficient use of resources) or under-provision resources (leading to performance degradation).

SUMMARY

A method is implemented by a computing device to optimize resource usage of service function chains (SFCs) in a network using machine learning. The computing device is coupled to a resource monitoring and management system. The method includes obtaining, from an autoscale machine learning (ML) system associated with a virtual network function (vNF), a suggested adjustment to an amount of resources provisioned for the vNF. The autoscale ML system is trained online using machine learning to predict an amount of resources to be utilized by the vNF. The autoscale ML system is configured to receive as input an amount of resources currently utilized by the vNF and an amount of resources currently available to the vNF, determine using machine learning the suggested adjustment to the amount of resources provisioned for the vNF based on the amount of resources currently utilized by the vNF and the amount of resources currently available to the vNF, and output the suggested adjustment to the amount of resources provisioned for the vNF. The method further includes providing the suggested adjustment to the amount of resources provisioned for the vNF to a resource re-allocator component.

A computing device is configured to optimize resource usage of service function chains (SFCs) in a network using machine learning. The computing device to be coupled to a resource monitoring and management system. The computing device includes a non-transitory machine-readable storage medium having stored therein an SFC resource optimization component and a set of one or more processors coupled to the non-transitory machine-readable storage medium. The set of one or more processors are configured to execute the SFC resource optimization component. The SFC resource optimization component is configured to obtain, from an autoscale ML system associated with a virtual network function (vNF), a suggested adjustment to an amount of resources provisioned for the vNF. The autoscale ML system is trained online using machine learning to predict an amount of resources to be utilized by the vNF. The autoscale ML system is configured to receive as input an amount of resources currently utilized by the vNF and an amount of resources currently available to the vNF, determine using machine learning the suggested adjustment to the amount of resources provisioned for the vNF based on the amount of resources currently utilized by the vNF and the amount of resources currently available to the vNF, and output the suggested adjustment to the amount of resources provisioned for the vNF. The SFC resource optimization component is further configured to provide the suggested adjustment to the amount of resources provisioned for the vNF to a resource re-allocator component.

A non-transitory machine-readable storage medium has computer code stored therein that is to be executed by a set of one or more processors of a computing device. The computer code, when executed by the computing device, causes the computing device to perform operations for optimizing resource usage of service function chains (SFCs) in a network using machine learning. The computing device to be coupled to a resource monitoring and management system. The operations include obtaining, from an autoscale machine learning (ML) system associated with a virtual network function (vNF), a suggested adjustment to an amount of resources provisioned for the vNF. The autoscale ML system is trained online using machine learning to predict an amount of resources to be utilized by the vNF. The autoscale ML system is configured to receive as input an amount of resources currently utilized by the vNF and an amount of resources currently available to the vNF, determine using machine learning the suggested adjustment to the amount of resources provisioned for the vNF based on the amount of resources currently utilized by the vNF and the amount of resources currently available to the vNF, and output the suggested adjustment to the amount of resources provisioned for the vNF. The operations further include providing the suggested adjustment to the amount of resources provisioned for the vNF to a resource re-allocator component.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
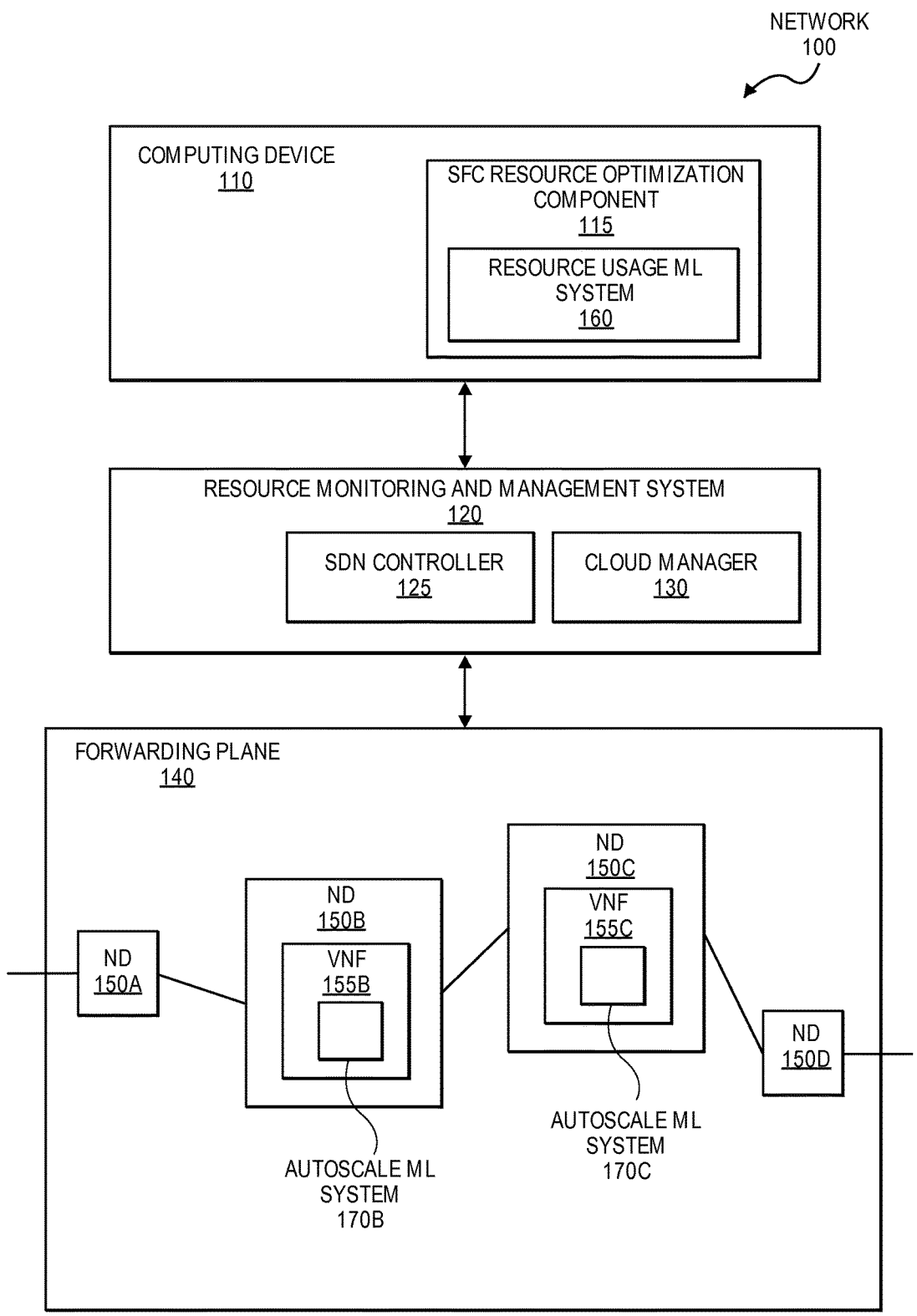
FIG. 1 is a block diagram illustrating a network in which resource optimization of service function chains (SFCs) can be implemented, according to some embodiments.

The following description describes methods and apparatus for optimizing resource usage of service function chains (SFCs) in a network using machine learning techniques. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device (e.g., a computing device) stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Existing solutions for provisioning service function chain (SFC) resources are based on static rules and policies. Static rules and policies usually either over-provision resources (leading to inefficient use of resources) or under-provision resources (leading to performance degradation). Embodiments introduce machine learning systems that can learn the resource consumption tendencies of SFCs. The machine learning systems can provide a more accurate determination of the amount of resources that an SFC will need and can predict when the amount of resources provisioned for an SFC needs to be adjusted. Embodiments utilize information obtained from machine learning systems to optimize resource usage of SFCs.

FIG. 1 is a block diagram illustrating a network in which resource optimization of SFCs can be implemented, according to some embodiments. In the illustrated embodiment, the network 100 includes a computing device 110, a resource monitoring and management system 120, and a forwarding plane 140. The forwarding plane 140 includes network devices (NDs) 150A-D.

The resource monitoring and management system 120 provides a unified platform for configuring, managing, and monitoring resources in the network. As illustrated, the resource monitoring and management system 120 includes an SDN controller 125 and a cloud manager 130. The SDN controller 125 can control traffic routing in the forwarding plane 140 by configuring the forwarding behavior of network devices 150A-D of the forwarding plane. In one embodiment, the SDN controller 125 configures the network devices 150A-D using a control plane communications protocol such as OpenFlow (e.g., OpenFlow 1.3). The cloud manager 130 can instantiate and manage virtual resources in the network 100. For example, the cloud manager 130 may instantiate and mange virtual machines (VMs), virtual network functions (vNFs) (e.g., vNF 155B and vNF 155C), virtual switches, and other types virtual resources in the network 100. In one embodiment, the resource monitoring and management system 120 may include other entities/functional units that can facilitate the configuration, management, and monitoring of resources in the network such as a network function virtualization orchestrator (NFVO) or other management and organization (MANO) entity.

The resource monitoring and management system 120 may leverage the SDN controller 125 and the cloud manager 130 to provide service chaining in the network 100. Service chaining refers to the differentiated forwarding of traffic flows across a policy-defined set of middleboxes (also called services, inline services, appliances, network functions, vNFs (e.g., vNF 155B and vNF 155C) in the case of network function virtualization (NFV), or service functions (SFs) as a general term). Examples of SFs include firewalls, content filters, intrusion detection systems (IDS), deep packet inspection (DPI), network address translation (NAT), content caches, load-balancers, wide area network (WAN) accelerators, multimedia transcoders, and logging/metering/charging/advanced charging applications. Service chaining typically involves a classification process to assign packets to the appropriate service chain, followed by the differentiated forwarding/routing of the traffic flow across the appropriate set of SFs (i.e., a service function chain (SFC)).

An SFC defines an ordered sequence of SFs that a traffic flow should traverse. The resource monitoring and management system 120 can provision an SFC in the network by deploying and/or configuring the SFs specified by the SFC and directing traffic flow across the SFs specified by the SFC. For example, an SFC may specify that traffic flow should traverse a deep packet inspection service function followed by an intrusion detection system service function. The resource monitoring and management system 120 may provision this SFC by initiating deployment of vNF 155B on network device 150B to perform the deep packet inspection service and initiating deployment of vNF 155C on network device 150C to perform the intrusion detection system service (e.g., via the cloud manager 130). If all the vNFs 155 needed for the SFC (e.g., vNF 155B and 155C) have already been deployed, then there is no need for the resource monitoring and management system 120 to initiate deployment of the vNFs 155. The resource monitoring and management system 120 may then direct traffic flow (e.g., via the SDN controller 125) across vNF 155B and vNF 155C such that the traffic flow is first processed by the deep packet inspection service function and then processed by the intrusion detection service function. In this way, the resource monitoring and management system 120 can provision an SFC in the network 100.

The resource monitoring and management system 120 is capable of monitoring the SFCs provisioned in the network 100. For example, the resource monitoring and management system 120 may collect information regarding the service functions (e.g., vNFs 155) and SFCs provisioned in the network. The resource monitoring and management system 120 may also collect information regarding the resource utilization of the vNFs 155 (including how many instances are deployed and their central processing unit (CPU)/memory/bandwidth utilization). The resource monitoring and management system 120 may also collect information regarding the availability of computing resources and network resources for service chaining. Furthermore, the resource monitoring and management system 120 may collect information regarding subscriber traffic, including how much subscriber traffic is directed to each SFC. The resource monitoring and management system 120 may also collect other real-time network and cloud metrics related to SFCs provisioned in the network such as traffic performance metrics and Quality of Experience (QoE) metrics.

As illustrated, the computing device 110 is coupled to the resource monitoring and management system 120 and has an SFC resource optimization component 115 installed therein. As will be described in additional detail herein below, the computing device 110 may execute the SFC resource optimization component 115 to optimize resource usage of SFCs. Although the SFC resource optimization component 115 is shown as being implemented by the computing device 110, in other embodiments, some or all of the functionality of the SFC resource optimization component 115 may be implemented by a different entity (e.g., the resource monitoring and management system 120). The SFC resource optimization component 115 relies on a resource usage machine learning (ML) system 160 and a set of autoscale machine learning (ML) systems 170 to optimize resource usage of SFCs. The resource usage machine learning system 160 utilizes machine learning techniques to determine the amount of resources to provision for an SFC before the SFC is provisioned in the network 100. The set of autoscale machine learning systems 170 utilizes machine learning techniques to determine when the amount of resources provisioned for an SFC needs to be adjusted (and by how much it should be adjusted) once the SFC is provisioned in the network 100.

When the SFC resource optimization component 115 receives a request to provision a new SFC (or update an existing SFC) in the network 100, the SFC resource optimization component 115 may rely on the resource usage machine learning system 160 to determine the amount of resources to provision for the SFC. The resource usage machine learning system 160 utilizes machine learning techniques to determine the suggested amount of resources to provision for the SFC. The SFC resource optimization component 115 may obtain this information from the resource usage machine learning system 160 and provide it to a resource allocator component (not shown) that will determine an optimal resource allocation scheme that allocates the amount of resources for the SFC as suggested by the resource usage machine learning system 160 (as best as possible). The resource allocator component can be implemented as part of the SFC resource optimization component 115 or separate from the SFC resource optimization component 115. The resource allocation scheme can be provided to the resource monitoring and management system 120 and the resource monitoring and management system 120 can provision the SFC in the network according to the resource allocation scheme. As illustrated, the resource usage machine learning system 160 is implemented as part of the SFC resource optimization component 115. However, in other embodiments, the resource usage machine learning system 160 may be implemented separate from the SFC resource optimization component 115 and in some cases, external to the computing device 110.

Once an SFC has been provisioned in the network 100, the SFC resource optimization component 115 may rely on a set of autoscale machine learning systems 170 to automatically predict when the amount of resources provisioned for the SFC needs to be adjusted (e.g., scaled up or scaled down), in advance of the need. The automatic scaling up or scaling down of resources is generally referred to herein as autoscale. In one embodiment, each vNF 155 deployed in the network is associated with an autoscale machine learning system 170. For example, as illustrated, vNF 155B is associated with autoscale machine learning system 170B and vNF 155C is associated with autoscale machine learning system 170C. The autoscale machine learning system 170 for a vNF 155 can predict when the amount of resources provisioned for the vNF 155 needs to be adjusted. When an autoscale machine learning system 170 associated with a vNF 155 predicts that the amount of resources provisioned for the vNF 155 needs to be adjusted, the autoscale machine learning system 170 sends an autoscale request to the SFC resource optimization component 115. The autoscale request may request an adjustment to the amount of resources provisioned for the vNF 155. For example, the autoscale request may indicate that the amount of resources provisioned for the vNF 155 needs to be adjusted up or down and by how much. The autoscale machine learning system 170 for a vNF 155 can constantly monitor the vNF 155 to determine when autoscale is needed and send autoscale requests to the SFC resource optimization component 115 when autoscale is needed. As illustrated, the autoscale machine learning systems 170 are implemented on the same network device 150 as their respective vNFs 155. However, in other embodiments, the autoscale machine learning systems 170 may be implemented on a separate server or in a performance optimized datacenter (POD). Architecturally, all of the autoscale machine learning systems 170 can reside in the same location (e.g., co-located with the resource monitoring and management system 120 or with computing device 110). In general, however, performance can be improved if the autoscale machine learning systems 170 are located closer to their respective vNFs 155. In one embodiment, the resource monitoring and management system 120 or computing device 110 may initiate deployment of a new autoscale machine learning system 170 for a vNF 155 (e.g., when the vNF 155 is deployed).

The SFC resource optimization component 115 may obtain autoscale requests from one or more of the autoscale machine learning systems 170 and provide the autoscale requests to a resource re-allocator component (not shown) that will determine an optimal resource re-allocation scheme that fulfills the autoscale requests (as best as possible). The resource re-allocator component can be implemented as part of the SFC resource optimization component 115 or separate from the SFC resource optimization component 115. The resource re-allocation scheme may involve performing load balancing, migrating or deploying new vNFs 155, or even de-allocating or turning off vNFs 155. The resource re-allocation scheme can be provided to the resource monitoring and management system 120 and the resource monitoring and management system 120 can re-allocate the resources according to the resource re-allocation scheme. In this way, embodiments optimize resource usage for SFCs using machine learning techniques.

Figure 2:
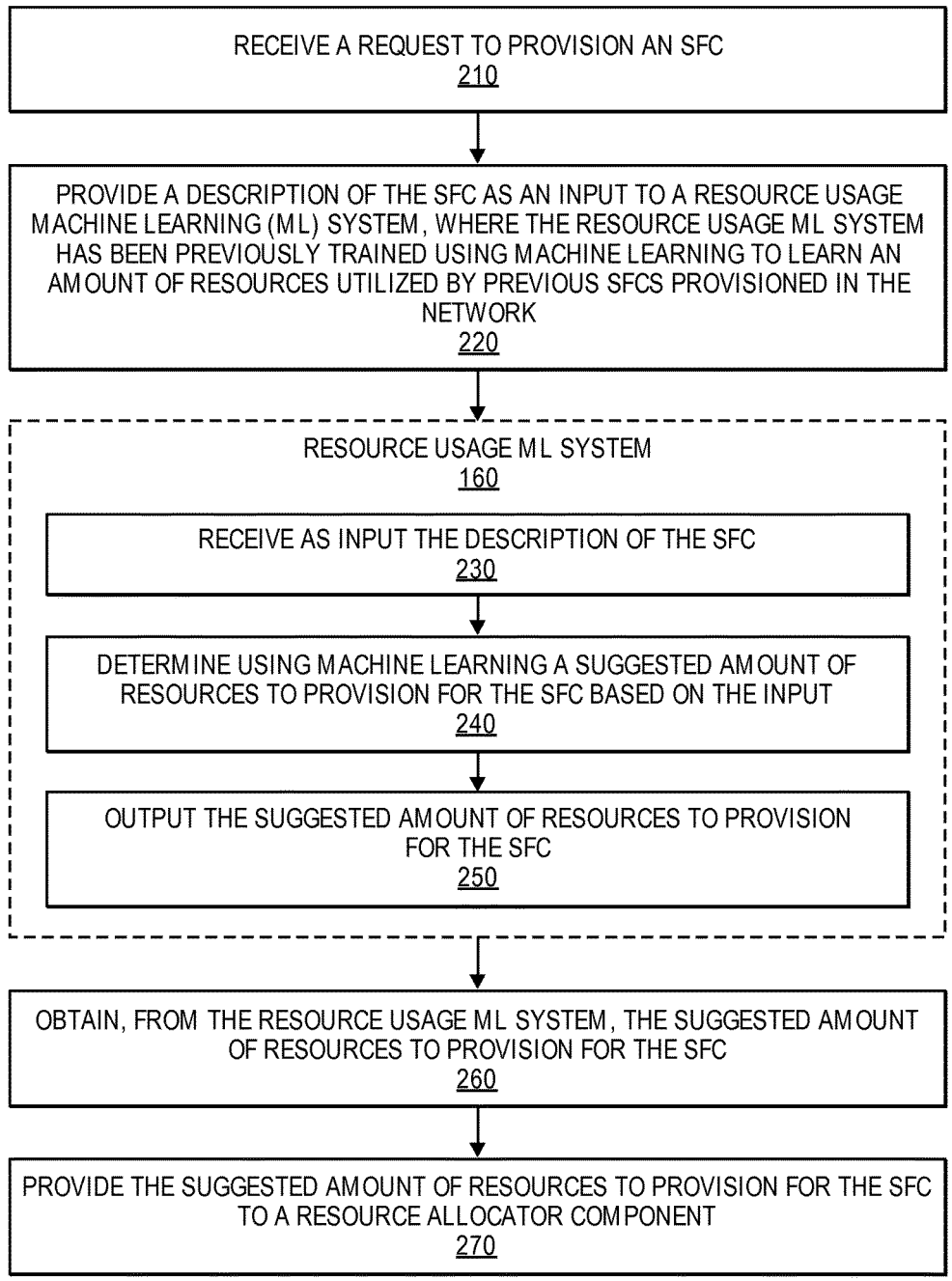
FIG. 2 is a flow diagram illustrating a process for optimizing resource usage of a new SFC to be provisioned in the network, according to some embodiments.

FIG. 2 is a flow diagram illustrating a process for optimizing resource usage of a new SFC to be provisioned in the network, according to some embodiments. The operations in the flow diagram may be implemented by a computing device 110 (e.g., SFC resource optimization component 115). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the computing device 110 receives a request to provision an SFC (block 210). In one embodiment, the request may be made by a network operator or an enterprise customer.

The computing device 110 provides a description of the SFC as an input to a resource usage machine learning system 160 (block 220). The resource usage machine learning system 160 is able to predict an amount of resources that the SFC will utilize based on learning (using machine learning) the actual resource usage of previous SFCs provisioned in the network 100. The resource usage machine learning system 160 receives as input the description of the SFC (block 230). In one embodiment, the description of the SFC includes an indication of the end points of the SFC and a list of service functions included in the SFC. In one embodiment, the description of the SFC includes the classification rules used to assign traffic to the SFC (e.g., SFC intent). The description of the SFC may include any other characteristics or properties of the SFC. The resource usage machine learning system 160 then uses machine learning techniques to determine a suggested amount of resources to provision for the SFC based on the input (i.e., the description of the SFC) (block 240). The resource usage machine learning system 160 then outputs the suggested amount of resources to provision for the SFC (block 250). In one embodiment, the suggested amount of resources to provision for the SFC includes a suggested amount of CPU resources (e.g., number of cores) to provision for the SFC, a suggested amount of memory to provision for the SFC, a suggested amount of bandwidth to provision for the SFC, a suggested amount of storage resources to provision for the SFC, or a suggested amount for any other type of network/computing resource to provision for the SFC. In one embodiment, the suggested amount of resources to provision for the SFC includes a suggested amount of resources to provision per service function included in the SFC.

The computing device 110 obtains the suggested amount of resources to provision for the SFC from the resource usage machine learning system 160 (block 260). In some cases, the entity that made the request to provision the SFC (e.g., the network operator or enterprise customer) may specify the resource demand of the SFC in their request. In one embodiment, the computing device 110 overrides the resource demand specified in the request with the suggested amount of resources obtained from the resource usage machine learning system 160.

The computing device 110 then provides the suggested amount of resources to provision for the SFC to a resource allocator component (block 270). The resource allocator component may utilize any suitable algorithm or strategy to determine an optimal resource allocation scheme that allocates the amount of resources suggested by the resource usage machine learning system 160 system for the SFC. In one embodiment, the resource allocator component has access to information regarding the network/cloud conditions (e.g., via resource monitoring and management system 120) and uses this information to determine an optimal resource allocation scheme that specifies or suggests where in the network 100 resources should be allocated. The resource allocator component may consider the current state of the network and infrastructure, information regarding currently up and running vNFs 155, operator policies on resource allocation, and other types of information when determining the optimal resource allocation scheme. The resource allocation scheme may reuse existing vNFs 155 in the network or deploy new vNFs 155. In one embodiment, the resource allocator component may apply other policies and validations to the resource allocation scheme. The resource allocation scheme can be provided to the resource monitoring and management system 120 and the resource monitoring and management system 120 can provision the SFC in the network according to the resource allocation scheme.

Figure 3:
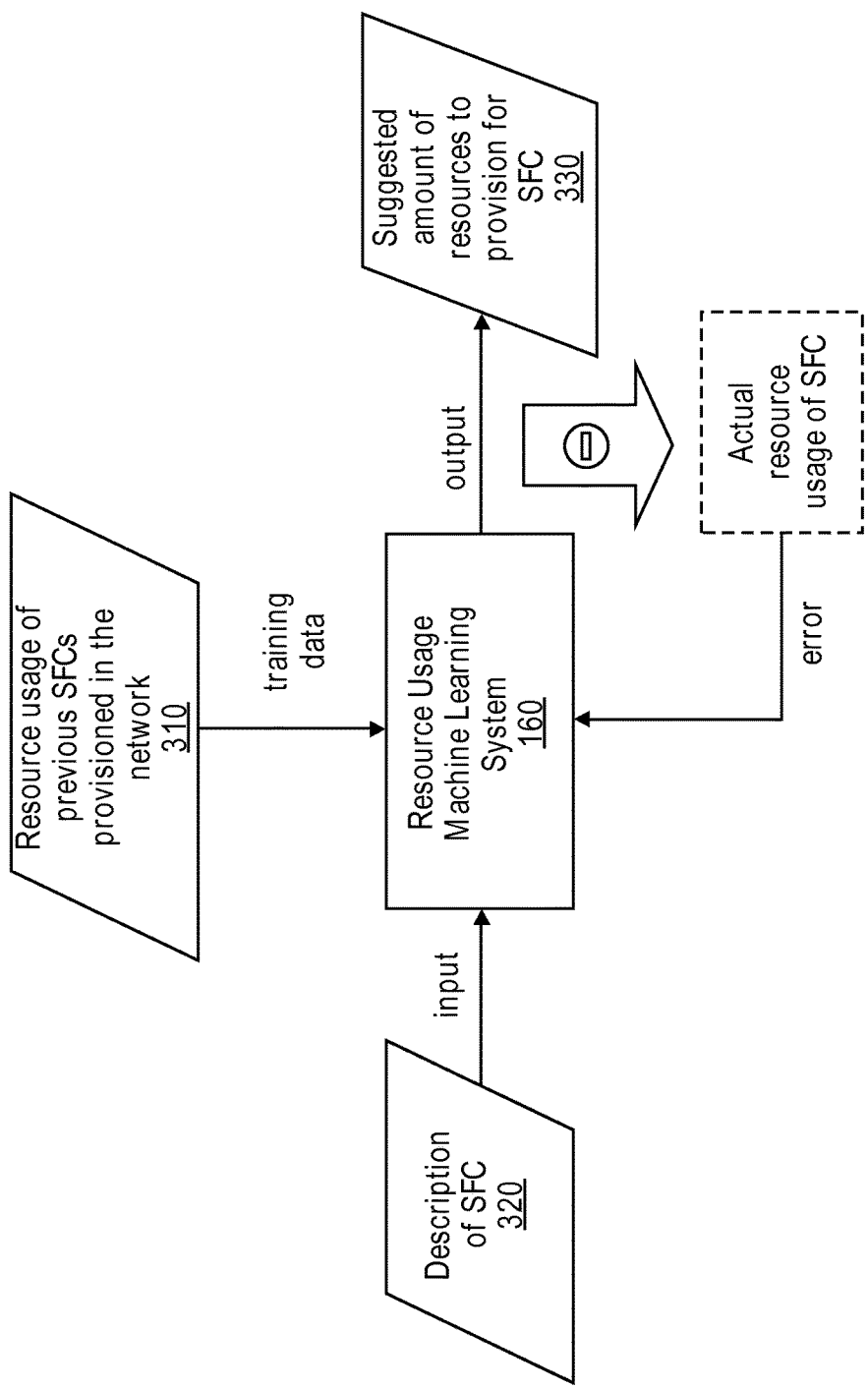
FIG. 3 is a diagram illustrating the inputs and outputs of a resource usage machine learning system, according to some embodiments.

FIG. 3 is a diagram illustrating the inputs and outputs of a resource usage machine learning system, according to some embodiments.

The resource usage machine learning system 160 is trained (using machine learning techniques) with the resource usage of previous SFCs provisioned in the network 100 (data 310). The resource usage machine learning system 160 is said to be "online" as it gets trained using live data. The resource usage machine learning system 160 can be trained using machine learning to learn how the resource usage of different SFCs differ depending on the end points of the SFCs, traffic type carried by the SFCs, time, location of the SFCs, and other information regarding the SFCs and/or other contextual information. This can be done by observing and learning (using machine learning) the resource usage behavior of previous SFCs provisioned in the network 100. Based on this training, the resource usage machine learning system 160 is able to determine the amount of resources that a given SFC will need. For example, if the resource usage machine learning system 160 has previously observed that a particular SFC used a certain amount of resources, then the resource usage machine learning system 160 may determine that any new SFCs that are similar to that particular SFC will use a similar amount of resources. This determination can be a complex function depending on the end points, traffic types, time (e.g., traffic produced at different time of days/week/year), the type of network functions included in the SFCs and their performance behavior with respect to given traffic types, and other parameters.

The input to the resource usage machine learning system 160 is a description of an SFC (data 320). In on embodiment, the description of the SFC may include source/destination information (i.e., end points) of the SFC and a resource demand of the SFC. An exemplary description of an SFC is provided below:

```
{"chain1": {
    "order": ["DPI", "IDS"],
    "resources": {
        "CPU": [
            {"SF": "DPI", "value": 2},
            {"SF": "IDS", "value": 4}
        ]
        "MEM": [
            {"SF": "DPI", "value": 16},
            {"SF": "IDS", "value": 8}
        ]
        "BW": 50
    },
    "EP_src": "IP@EricssonSJ",
    "EP_dst": "IP@exitGW"
    }
}
```

The exemplary description of the SFC specifies Ericsson SJ as the source of the SFC and the Internet as the destination of the SFC. The description also specifies a chain (i.e., "chain1") of service functions consisting of a deep packet inspection service function followed by an intrusion detection system service function. The description also specifies the amount of CPU and memory requested for each of the service functions, as well as the amount of bandwidth requested. In this example, 2 virtual CPUs and 16 GB of memory are requested for the deep packet inspection service function and 4 virtual CPUs and 8 GB of memory are requested for the intrusion detection system service function. The bandwidth requested is 50 Gbps.

The amount of resources requested for the SFC (e.g., as specified in the description of the SFC) may be different from the amount of resources that the SFC will actually consume. Thus, provisioning the amount of resources as specified in the request may result in under-provisioning or over-provisioning of resources for the SFC. The resource usage machine learning system 160 may use machine learning techniques to more accurately determine the amount of resources that the SFC will consume based on its previous training/learning. The resource usage machine learning system 160 may then output this amount as the suggested amount of resources to provision for the SFC (data 330). For example, the resource usage machine learning system 160 may suggest that the deep packet inspection service function should be provisioned 3 virtual CPUs (instead of the 2 virtual CPUs initially requested) and that the intrusion detection system service function should be provisioned 16 GB of memory (instead of the 8 GB of memory initially requested). Also, the resource usage machine learning system 160 may suggest that 55 Gbps of bandwidth should be provisioned for the SFC (instead of the 50 Gbps initially requested).

In one embodiment, the resource usage machine learning system 160 includes an error feedback mechanism to help the resource usage machine learning system 160 learn from any inaccurate results it outputs. The error feedback mechanism compares the output of the resource usage machine learning system 160 to the actual resource usage of the SFC, and feeds back the difference as an error to the resource usage machine learning system 160. The resource usage machine learning system 160 can use the error information to make better decisions for future requests. In one embodiment, the error feedback mechanism verifies that the error was not caused by external factors such as software/hardware failures.

Figure 4:
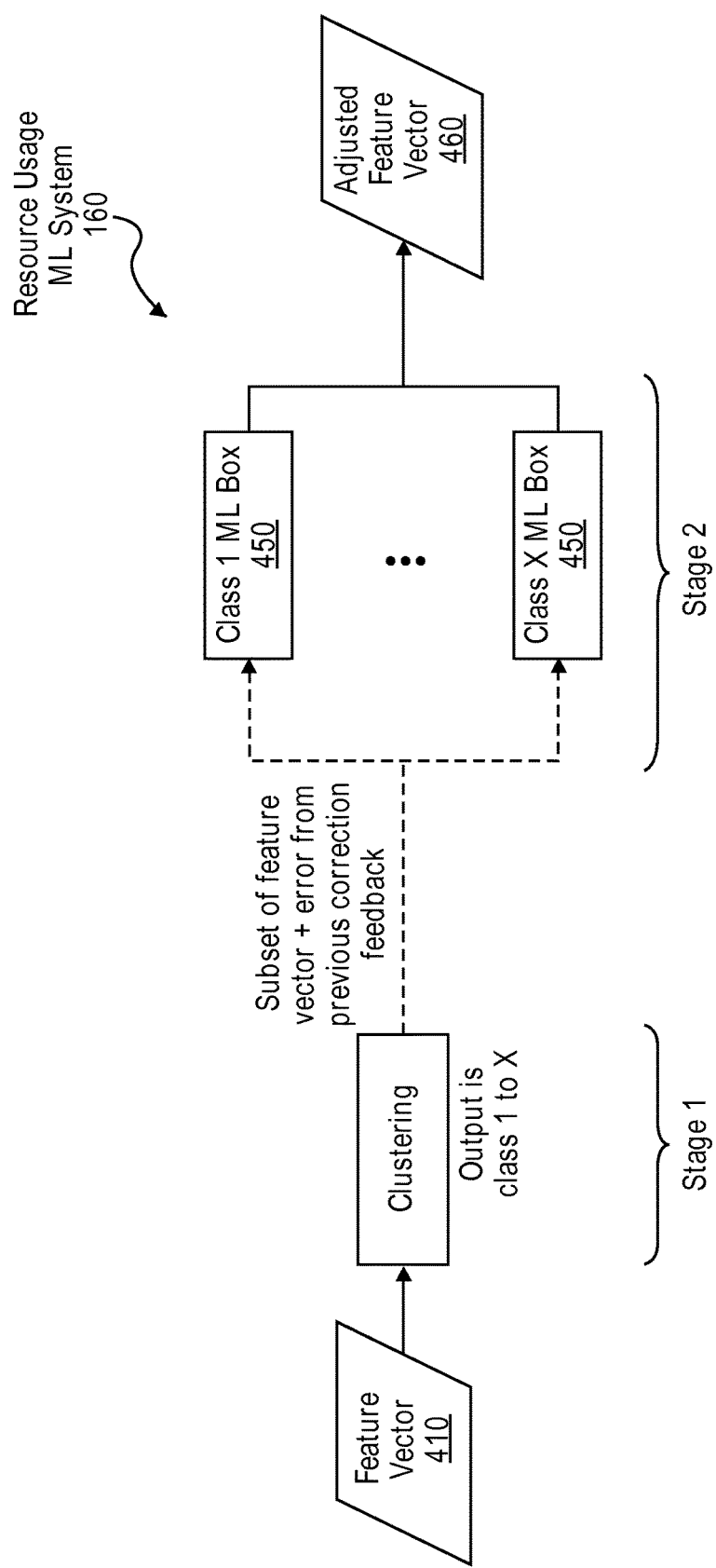
FIG. 4 is a diagram illustrating the internal stages of a resource usage machine learning system, according to some embodiments.

FIG. 4 is a diagram illustrating the internal stages of a resource usage machine learning system, according to some embodiments.

The resource usage machine learning system 160 takes a feature vector 410 as input. The feature vector 410 may include information that describes an SFC (e.g., data 320 in FIG. 3). As illustrated, the resource usage machine learning system 160 includes two stages. The first stage clusters the input, for example, based on time/day/year, source/destination of the SFC, or other characteristics/properties of the SFC described in the feature vector 410 and/or other contextual information. The clustering may classify the feature vector 410 into a class (e.g., class 1 to class X). The second stage includes a machine learning box 450 for each class. A subset of the feature vector 410 (and contextual information—e.g., time/day/year information) and error from previous correction feedback is directed to the appropriate machine learning box 450 in the second stage, as determined by the clustering in the first stage. In one embodiment, the subset of the feature vector 410 may exclude the features in the original feature vector 410 that were used for clustering. In one embodiment, the subset of the feature vector 410 may include engineered features based on the raw features in the feature vector 410. In one embodiment, the subset of the feature vector 410 may include a confidence interval of the clustering performed in the first stage. In the second stage, the machine learning box 450 (that was selected by the clustering in the first stage) uses machine learning techniques to determine the suggested amount of resources to provision for the SFC based on the subset of the feature vector 410 and contextual information (e.g., time/day/year information) it received as input. Also, the machine learning box 450 may use the error feedback to learn from its mistakes. The machine learning box 450 then outputs an adjusted feature vector 460 with adjusted values (e.g., adjusted with the suggested amount of resources to provision for the SFC as determined by a machine learning box 450 in the second stage).

Clustering may be useful because the amount of resources that an SFC consumes may depend on time of day/week/year, end points, and other factors. Clustering may provide more accurate results by grouping SFCs that have similar characteristics/properties into a class and providing a separate dedicated machine learning subsystem for each class. Classes can be formed based on time of day, calendar day, per endpoints, and chain types. Chain types could be formed based on high compute vNFs or high memory vNFs or both. The number of classes can be configured, as needed to achieve a desired level of accuracy.

Various machine learning techniques can be used to implement the internal stages of the resource usage machine learning system 160. For example, the first stage can be implemented using a decision tree and the second stage can be implemented using a neural network (e.g., Bayesian neural network).

Figure 5:
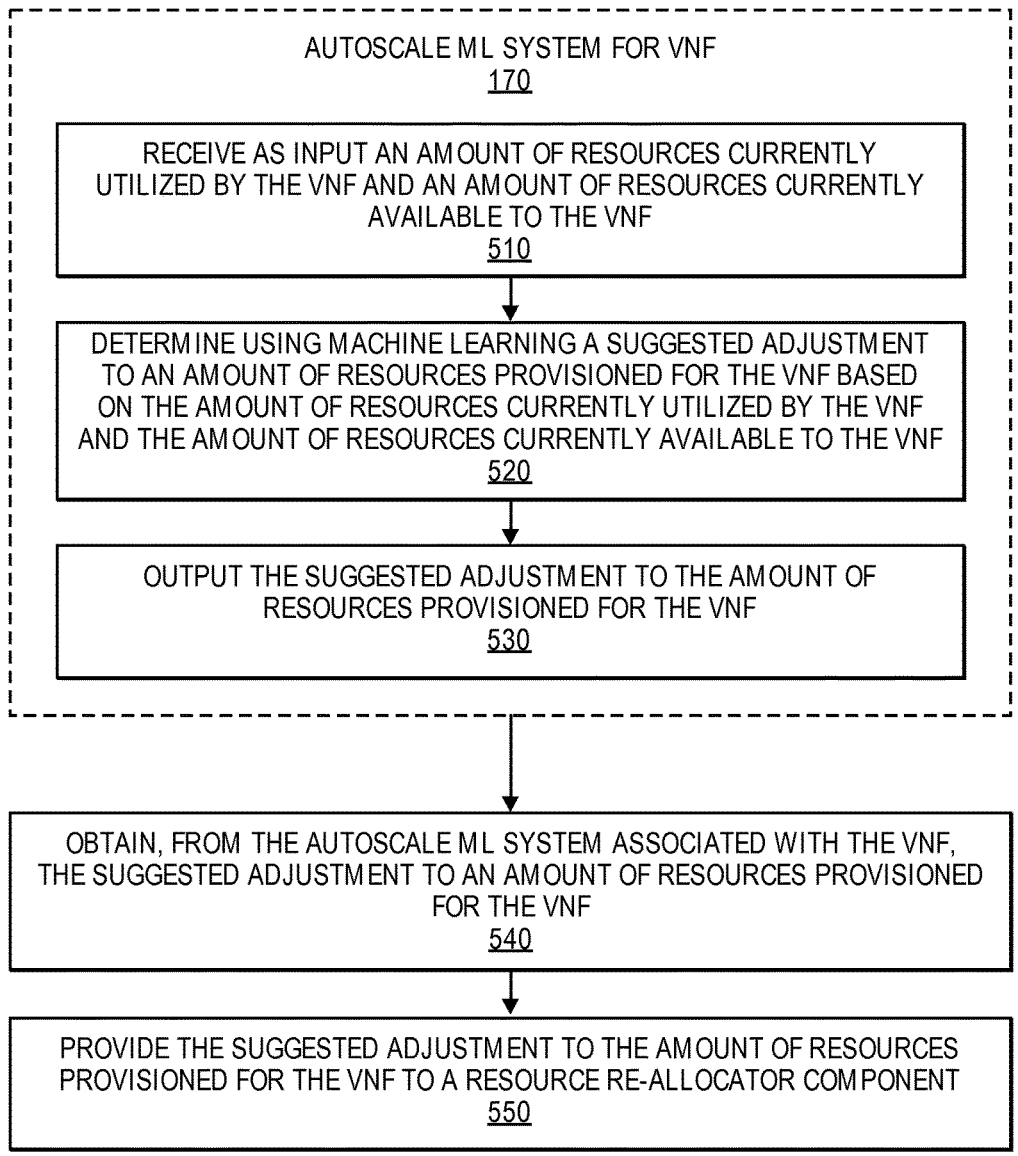
FIG. 5 is a flow diagram illustrating a process for optimizing resource usage of existing SFCs in the network, according to some embodiments.

FIG. 5 is a flow diagram illustrating a process for optimizing resource usage of existing SFCs in the network, according to some embodiments. The operations in the flow diagram may be implemented by a computing device 110 (e.g., SFC resource optimization component 115).

The process relies on information provided by an autoscale machine learning system 170 associated with a vNF 155. The autoscale machine learning system 170 for the vNF 155 can predict when the amount of resources provisioned for the vNF 155 needs to be adjusted and by how much. The autoscale machine learning system 170 for the vNF 155 is trained online using machine learning to predict when autoscale is needed for the vNF 155. The autoscale machine learning system 170 receives as input an amount of resources currently utilized by the vNF 155 and an amount of resources currently available to the vNF 155 (block 510). The autoscale machine learning system 170 uses machine learning to determine a suggested adjustment to an amount of resources provisioned for the vNF 155 based on the amount of resources currently utilized by the vNF 155 and the amount of resources currently available to the vNF 155 (block 520). In one embodiment, the autoscale machine learning system 170 also receives information regarding the SFCs that are currently utilizing the vNF as input and determines the suggested adjustment to the amount of resources provisioned for the vNF based on the information regarding the SFCs that are currently utilizing the vNF. The autoscale machine learning system 170 then outputs the suggested adjustment to the amount of resources provisioned for the vNF 155 (block 530). In one embodiment, the suggested adjustment to the amount of resources provisioned for the vNF 155 includes a suggested adjustment to an amount of CPU resources (e.g., number of cores) provisioned for the vNF 155, a suggested adjustment to an amount of memory provisioned for the vNF 155, a suggested adjustment to an amount of bandwidth provisioned for the vNF 155, a suggested adjustment to an amount of storage resources provisioned for the vNF 155, or a suggested adjustment to any other type of network/computing resource provisioned for the vNF 155. In one embodiment, the vNF 155 includes multiple vNF components. In such an embodiment, the suggested adjustment may include a suggested adjustment to an amount of resources provisioned per vNF component of the vNF 155. In one embodiment, the suggested adjustment includes an urgency flag. The urgency flag indicates whether the need for resource adjustment is urgent or not. In one embodiment, the urgency flag can be accompanied with a value indicating a maximum amount of time in which the resource adjustment needs to take place.

The computing device 110 obtains, from the autoscale machine learning system 170 associated with the vNF 155, the suggested adjustment to the amount of resources provisioned for the vNF 155 (block 540) and provides the suggested adjustment to a resource re-allocator component (block 550). The resource re-allocator component may utilize any suitable algorithm or strategy to determine an optimal resource re-allocation scheme that fulfills the suggested resource adjustments. In one embodiment, the resource re-allocator component has access to information regarding the network/cloud conditions (e.g., via resource monitoring and management system 120) and uses this information to determine an optimal resource re-allocation scheme that specifies or suggests where in the network 100 resources should be allocated and/or de-allocated. The resource re-allocator component may consider the current state of the network and infrastructure, information regarding other currently up and running vNFs 155, operator policies on resource allocation, and other types of information when determining the optimal resource re-allocation scheme. The re-allocation scheme should preferably minimize the impact on existing SFCs and services, and minimize the number of VM migrations. The resource re-allocation scheme can be provided to a resource monitoring and management system 120 and the resource monitoring and management system 120 can re-allocate the resources according to the resource re-allocation scheme.

Figure 6:
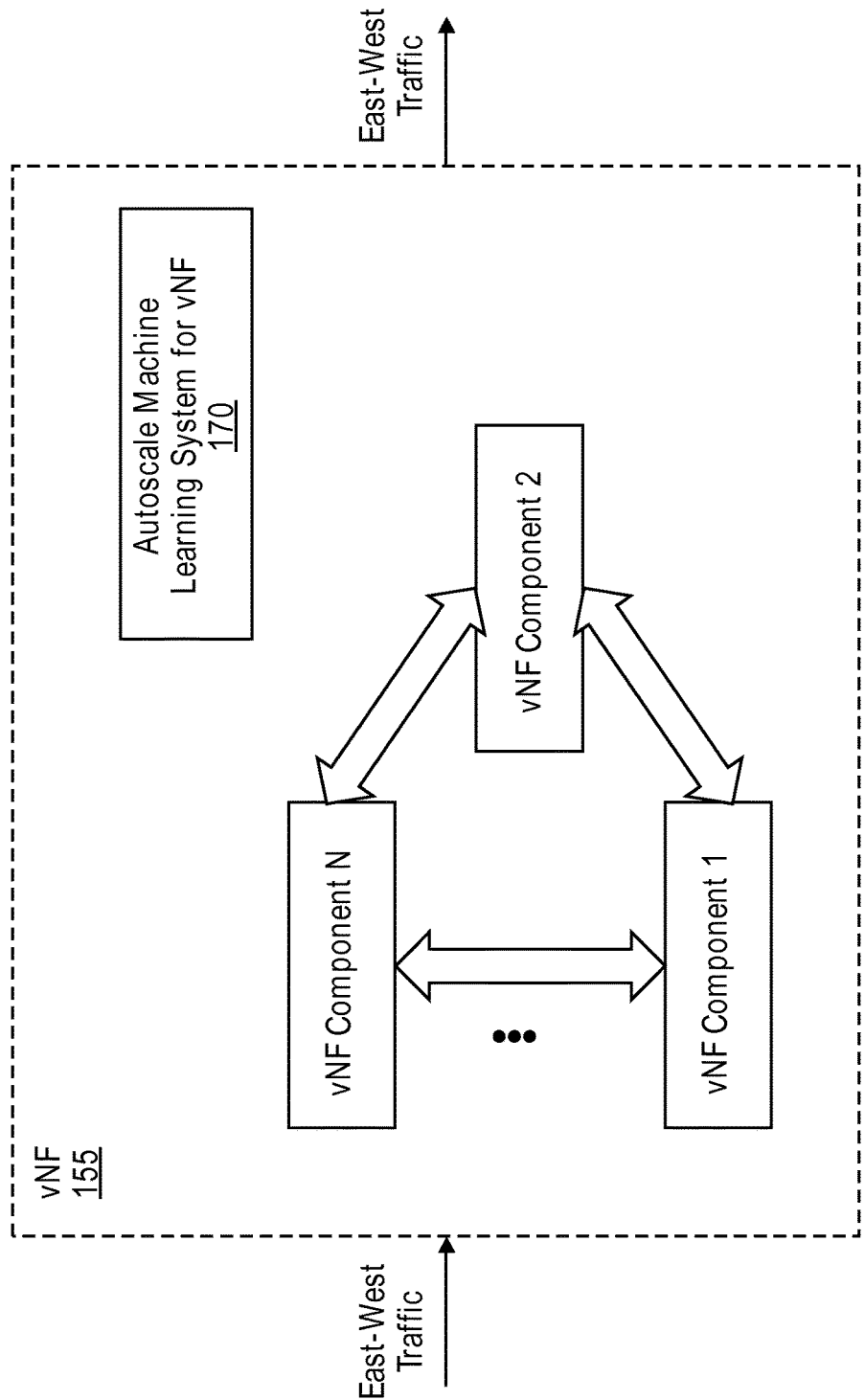
FIG. 6 is a diagram illustrating components of a virtual network function (vNF), according to some embodiments.

FIG. 6 is a diagram illustrating components of a virtual network function, according to some embodiments.

As illustrated, the vNF 155 includes N vNF components (vNF component 1, vNF component 2, . . . , vNF component N). Each vNF component provides a subset of the vNF's functionality. The vNF components may communicate with each other to realize the functionality of the vNF 155. The traffic flow between the vNF components may be referred to herein as inter-vNF component traffic or inter-component traffic. Traffic that flows through the entire vNF 155 is referred to herein as east-west traffic. In one embodiment, the vNF 155 may be associated with an autoscale machine learning system 170. The autoscale machine learning system 170 may monitor each of the vNF components and use machine learning techniques to determine when autoscale is needed for the vNF 155. The vNF 155 is illustrated with a dotted line to indicate that the various components of the vNF 155 (e.g., vNF components 1-N and the autoscale machine learning system 170) need not be co-located or implemented by the same device. In some embodiments, the various components of the vNF 155 may be implemented in a distributive manner across the network 100.

Figure 7:
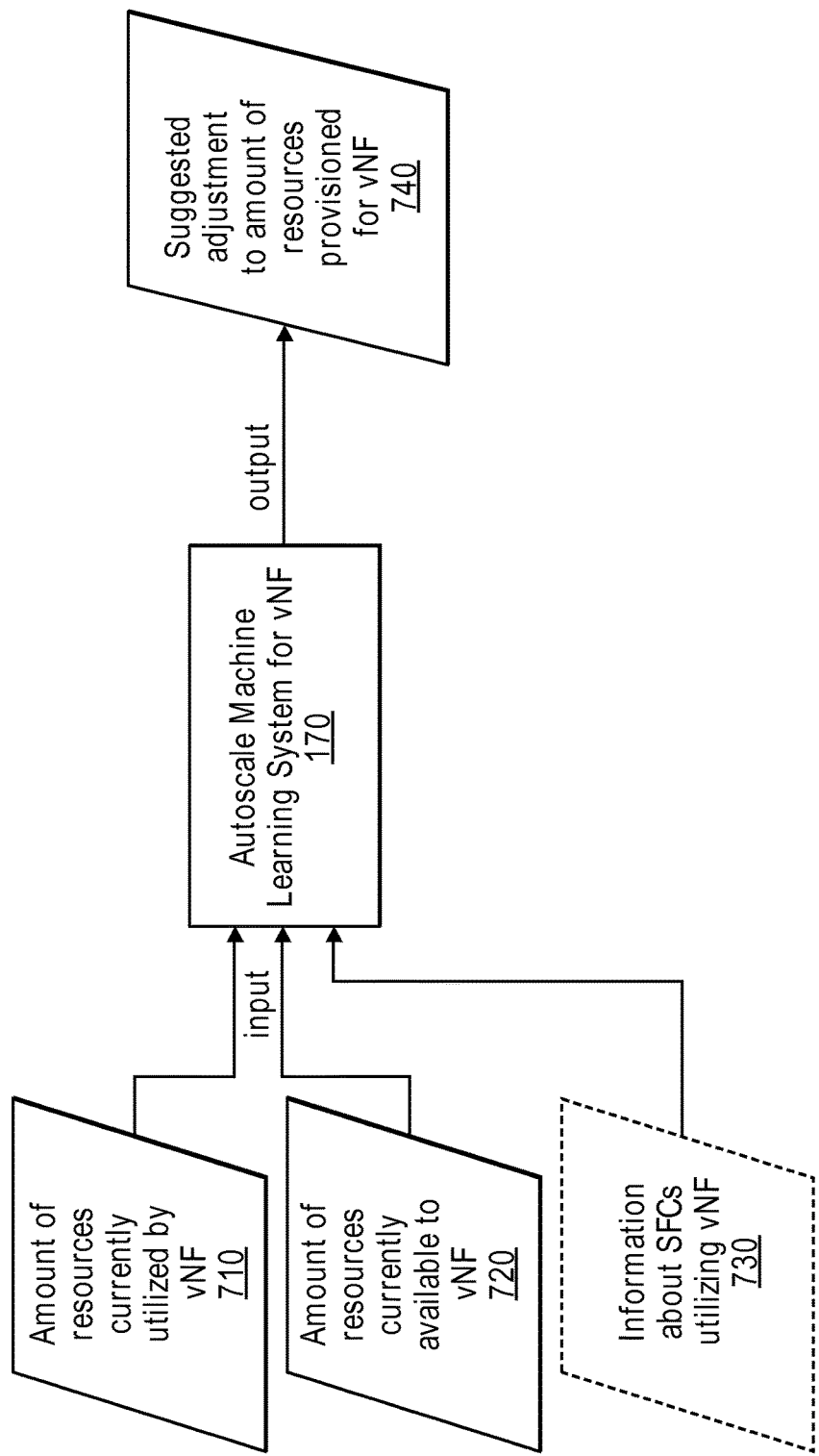
FIG. 7 is a diagram illustrating the inputs and outputs of an autoscale machine learning system, according to some embodiments.

FIG. 7 is a diagram illustrating the inputs and outputs of an autoscale machine learning system, according to some embodiments.

The autoscale machine learning system 160 for a vNF 155 can be trained using machine learning techniques to learn when the resource usage of the vNF 155 will change. This can be done by observing and learning (using machine learning) the resource usage behavior of the vNF 155 and how the resource usage of the vNF 155 changes depending on the SFCs that traverse the vNF, time, location of the vNF, and other information regarding the vNF and/or other contextual information. The input to the autoscale machine learning system 170 for a vNF 155 includes the amount of resources currently utilized by the vNF 155 (data 710) and the amount of resources currently available to the vNF 155 (data 720). For example, the amount of resources currently utilized by the vNF 155 may include the CPU usage and memory usage per vNF component of the vNF 155, as well as the bandwidth usage of the vNF 155 (both inter-component bandwidth and the east-west bandwidth used by the vNF 155). The amount of resources currently available to the vNF 155 may include the amount of CPU and memory resources available per vNF component of the vNF 155, as well as the amount of bandwidth available to the vNF 155 (both inter-component bandwidth and the east-west bandwidth available to the vNF 155). In one embodiment, the input to the autoscale machine learning system 170 includes information about the SFCs that utilize the vNF 155 (data 730). The autoscale machine learning system 170 can use this information to learn the difference in resource consumption when a new SFC joins the traffic load. In one embodiment, the input to the autoscale machine learning system 170 includes time and date information or other contextual information. The inputs to the autoscale machine learning system 170 are provided by way of example and not limitation. The inputs to the autoscale machine learning system 170 may include any type of information that will help the autoscale machine learning system 170 to determine when autoscale is needed and how much autoscale is needed. For example, the inputs may also include external inputs from domain experts and effects of past autoscale decisions.

The autoscale machine learning system 170 uses machine learning techniques to determine a suggested adjustment to the amount of resources provisioned for the vNF 155 based on the input. The output of the autoscale machine learning system 170 is the suggested adjustment to the amount of resources provisioned for the vNF 155 (data 740). The suggested adjustment may suggest that the amount of resources provisioned for the vNF 155 should be scaled up or scaled down, and also provide a suggested amount by which the amount of resources should be adjusted. In one embodiment, the suggested adjustment may suggest an adjustment for each vNF component of the vNF 155. For example, the suggested adjustment may suggest scaling up or scaling down the amount of CPU resources and memory provisioned for each vNF component of the vNF 155. The suggested adjustment may also suggest scaling up or scaling down the amount of inter-component bandwidth and/or east-west bandwidth provisioned for the vNF 155. In one embodiment, the suggested adjustment includes an urgency flag that indicates whether the need for adjustment is urgent. For example, the autoscale machine learning system 170 may set the urgency flag to an affirmative value if the vNF 155 is very close to utilizing all the resources provisioned for the vNF 155. In one embodiment, the urgency flag can be accompanied with a value indicating a maximum amount of time in which the resource adjustment needs to take place.

Figure 8:
FIG. 8 is a diagram illustrating internals of an autoscale machine learning system, according to some embodiments.

FIG. 8 is a diagram illustrating internals of an autoscale machine learning system, according to some embodiments.

Internally, the autoscale machine learning system 170 for a vNF 155 keeps track of the vNF components of the vNF 155 and the inter-component connections (the vNF component interconnections). The autoscale machine learning system 170 monitors and predicts resource utilization per vNF component and also monitors and predicts vNF bandwidth usage/performance, as well as the east-west bandwidth that goes through the vNF 155. Based on this information, the autoscale machine learning system 170 may output an autoscale adjustment per vNF component.

As illustrated, the autoscale machine learning system 170 includes a machine learning box for each vNF component. The machine learning box for a vNF component receives as input the resource utilization of the vNF component, time/date information, and SFC information (of the SFCs that utilize the vNF component). Based on this input, the machine learning box uses machine learning techniques to determine the autoscale up/down amount for the vNF component and an urgency flag that indicates whether the need for autoscale is urgent or not. The machine learning box provides this information as output. The output from each machine learning box is provided as an output of the autoscale machine learning system 170.

The machine learning boxes may utilize any suitable machine learning technique. In one embodiment, the machine learning boxes may utilize a multi-stage threshold system such as that described in U.S. patent application Ser. No. 14/689,040 filed on Apr. 16, 2015, which is hereby incorporated in its entirety by reference, to monitor resource utilization/availability and predict the need for autoscale. The idea is to constantly monitor resource utilization (e.g., CPU, memory, and bandwidth) and watch for when the rate of change of resource utilization varies with specific trend (speed, value). Other types of techniques can be used to predict the rate of change in resource utilization. For example, Kalman filters or neural networks can be used to predict the rate of change in resource utilization.

In one embodiment, the autoscale machine learning system 170 learns the effect of various SFCs on its various vNF components at various times (e.g., time of day, day of week, month, etc.). This information may allow the autoscale machine learning system 170 to provide more accurate predictions for autoscale.

The machine learning systems described herein can be used in other ways to optimize resource usage of SFCs. In one embodiment, the resource usage machine learning system 160 can serve as a recommender system. For example, if a user requests for a certain amount of resources to be provisioned for an SFC that is different from the actual amount of resources that the SFC will consume (as determined by the resource usage machine learning system 160), the resource usage machine learning system 160 may provide the suggested amount of resources to provision for the SFC to the user and ask if the user would like to accept the suggested amount or continue with the originally requested amount.

The learning performed by the machine learning systems can be imported to a network management and planning tool (e.g., a simulator) and can be used to predict the required dimensioning for network resources (e.g., where more memory and CPU resources are needed). In one embodiment, the machine learning systems can be pre-trained in a simulator before being deployed in a live network. Network managers can obtain a graph that shows resource consumption history and projection with some error margin, and this data can be used to pre-train the machine learning systems.

Figure 9A:
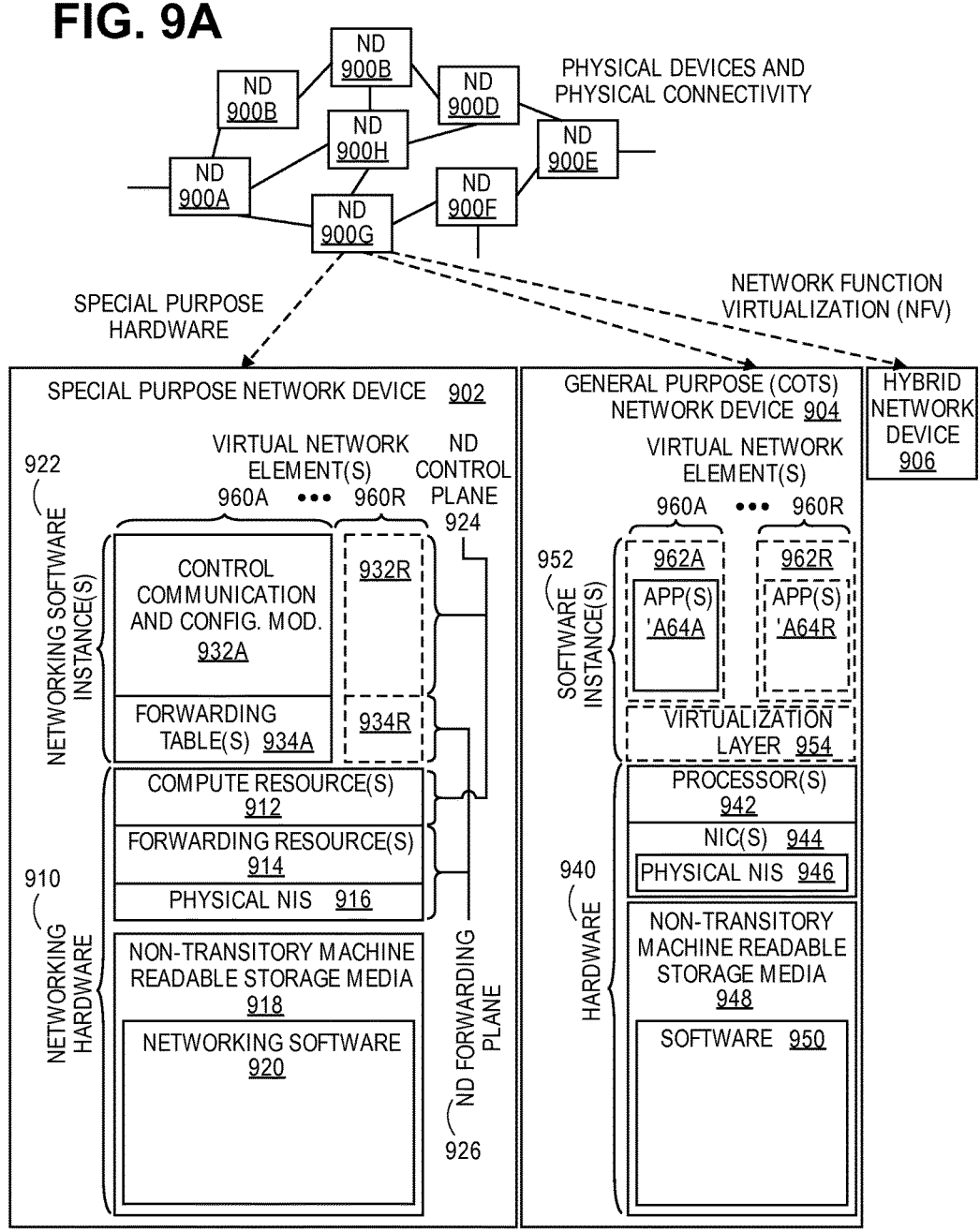
FIG. 9A illustrates connectivity between network devices (NDs) within an exemplary network, as well as three exemplary implementations of the NDs, according to some embodiments.

FIG. 9A illustrates connectivity between network devices (NDs) within an exemplary network, as well as three exemplary implementations of the NDs, according to some embodiments. FIG. 9A shows NDs 900A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 900A, E, and F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a proprietary operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
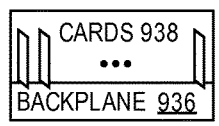
FIG. 9B illustrates an exemplary way to implement a special-purpose network device according to some embodiments.

FIG. 9B illustrates an exemplary way to implement the special-purpose network device 902 according to some embodiments. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization—represented by a virtualization layer 954 and software containers 962A-R. For example, one such alternative embodiment implements operating system-level virtualization, in which case the virtualization layer 954 represents the kernel of an operating system (or a shim executing on a base operating system) that allows for the creation of multiple software containers 962A-R that may each be used to execute one of the sets of applications 964A-R. In this embodiment, the multiple software containers 962A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 954 represents a hypervisor (sometimes referred to as a virtual machine monitor (VMM)) or a hypervisor executing on top of a host operating system; and 2) the software containers 962A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 964A-R, as well as the virtualization layer 954 and software containers 962A-R if implemented, are collectively referred to as software instance(s) 952. Each set of applications 964A-R, corresponding software container 962A-R if implemented, and that part of the hardware 940 that executes them (be it hardware dedicated to that execution and/or time slices of hardware temporally shared by software containers 962A-R), forms a separate virtual network element(s) 960A-R.

The virtual network element(s) 960A-R perform similar functionality to the virtual network element(s) 930A-R— e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 962A-R differently. For example, while embodiments of the invention are illustrated with each software container 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 962A-R to VNEs also apply to embodiments where such a finer level of granularity is used.

In certain embodiments, the virtualization layer 954 includes a virtual switch that provides similar forwarding services as a physical Ethernet switch. Specifically, this virtual switch forwards traffic between software containers 962A-R and the NIC(s) 944, as well as optionally between the software containers 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 9C:
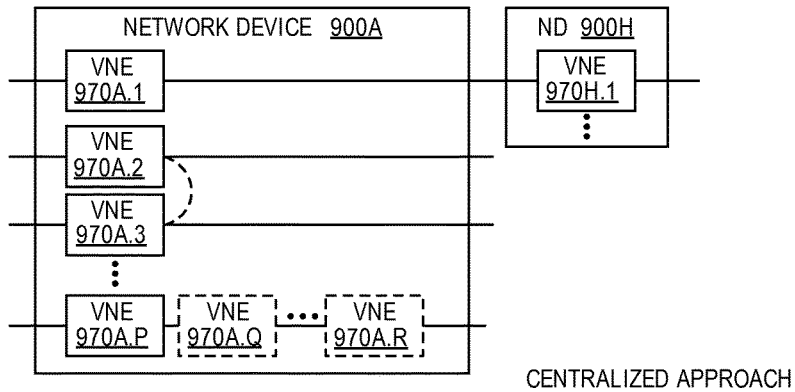
FIG. 9C illustrates various exemplary ways in which virtual network elements (VNEs) may be coupled according to some embodiments.

FIG. 9C illustrates various exemplary ways in which VNEs may be coupled according to some embodiments. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software containers 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
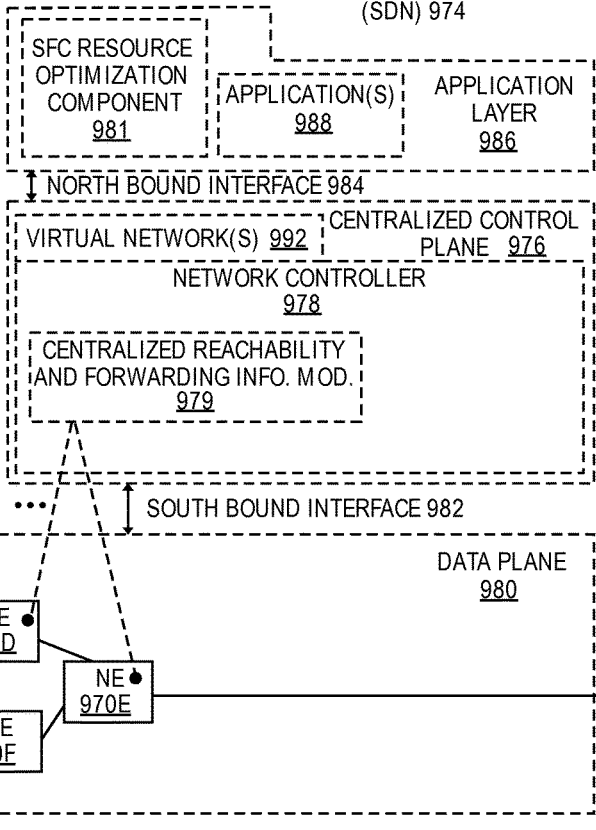
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the application layer 986 may include an SFC resource optimization component 981 that when executed by a computing device, causes the computing device to perform operations of one or more embodiments described herein above. In one embodiment, some of the operations of the one or more embodiments may also be performed at the centralized control plane 976.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
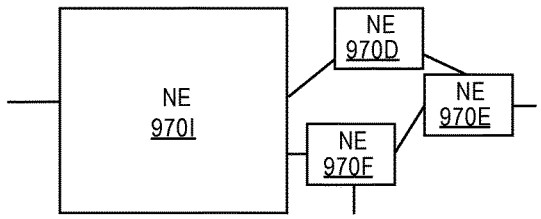
FIG. 9E illustrates the simple case of where each of the NDs implements a single NE, but a centralized control plane has abstracted multiple of the NEs in different NDs into (to represent) a single NE in one of the virtual network(s), according to some embodiments.
Figure 9F:
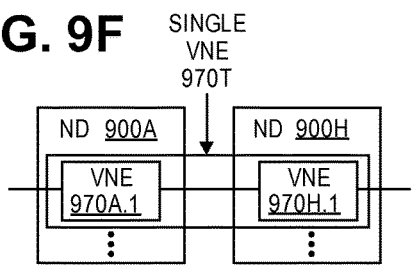
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments. Thus, the abstraction of a NE or VNE can span multiple NDs.

While some embodiments implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
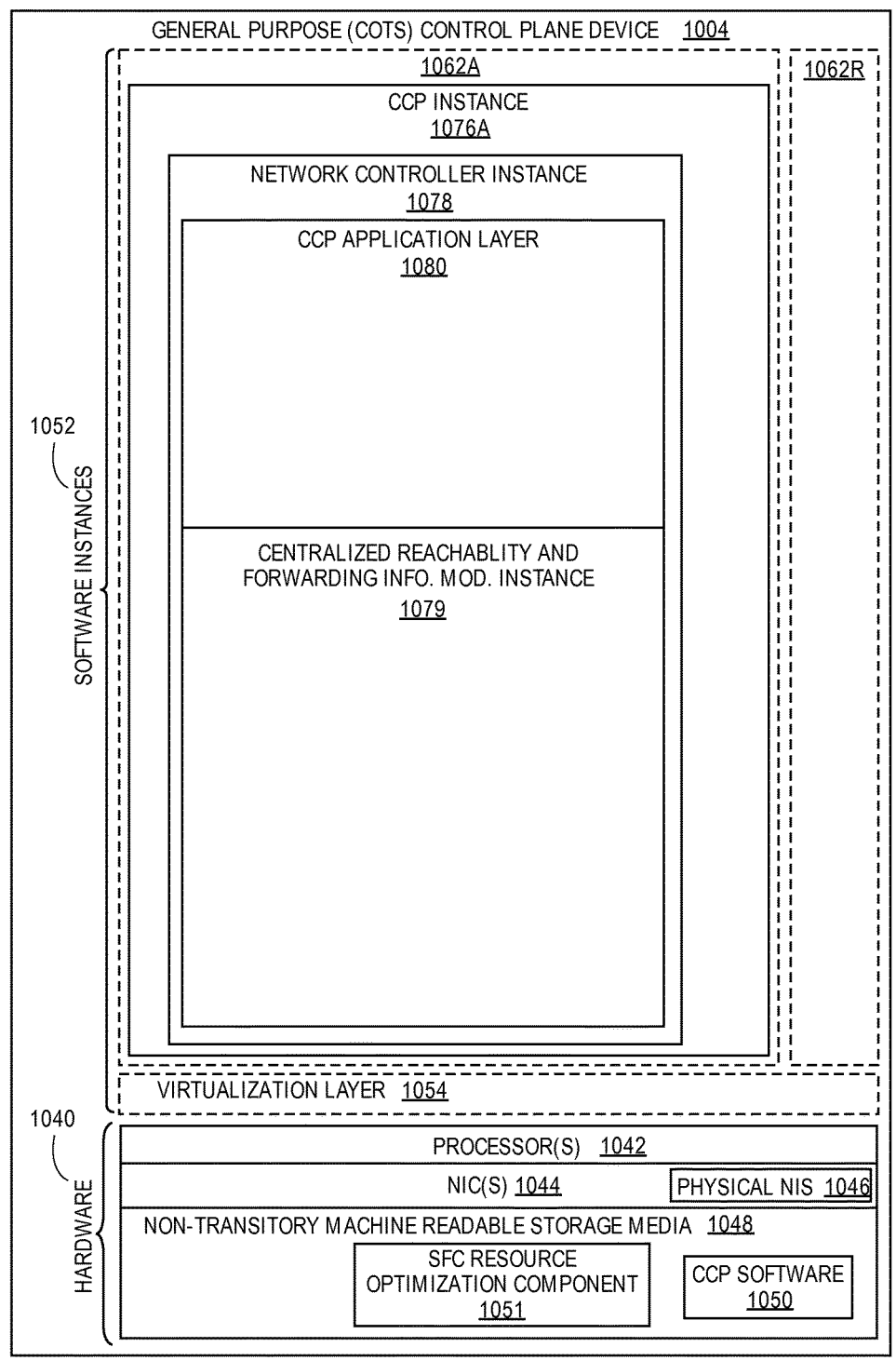
FIG. 10 illustrates a general purpose control plane device with centralized control plane (CCP) software, according to some embodiments.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050 and an SFC resource optimization component 1051.

In embodiments that use compute virtualization, the processor(s) 1042 typically execute software to instantiate a virtualization layer 1054 and software container(s) 1062A-R (e.g., with operating system-level virtualization, the virtualization layer 1054 represents the kernel of an operating system (or a shim executing on a base operating system) that allows for the creation of multiple software containers 1062A-R (representing separate user space instances and also called virtualization engines, virtual private servers, or jails) that may each be used to execute a set of one or more applications; with full virtualization, the virtualization layer 1054 represents a hypervisor (sometimes referred to as a virtual machine monitor (VMM)) or a hypervisor executing on top of a host operating system, and the software containers 1062A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 1050 (illustrated as CCP instance 1076A) is executed within the software container 1062A on the virtualization layer 1054. In embodiments where compute virtualization is not used, the CCP instance 1076A on top of a host operating system is executed on the "bare metal" general purpose control plane device 1004. The instantiation of the CCP instance 1076A, as well as the virtualization layer 1054 and software containers 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view.

The SFC resource optimization component 1051 can be executed by hardware 1040 to perform operations of one or more embodiments of the present invention as part of software instances 1052.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method by a computing device to optimize resource usage of service function chains (SFCs) in a network using machine learning, the computing device coupled to a resource monitoring and management system, the method comprising:
   obtaining, from an autoscale machine learning (ML) system associated with a virtual network function (vNF), a suggested adjustment to an amount of resources provisioned for the vNF, wherein the autoscale ML system is trained online using machine learning to predict an amount of resources to be utilized by the vNF, and wherein the autoscale ML system is configured to receive as input an amount of resources currently utilized by the vNF, an amount of resources currently available to the vNF, and information regarding SFCs that are currently utilizing the vNF, determine using machine learning the suggested adjustment to the amount of resources provisioned for the vNF based on the amount of resources currently utilized by the vNF, the amount of resources currently available to the vNF, and the information regarding SFCs that are currently utilizing the vNF, and output the suggested adjustment to the amount of resources provisioned for the vNF, wherein the autoscale ML system uses the information regarding SFCs that are currently utilizing the vNF to learn a difference in resource consumption by the vNF when a new SFC starts utilizing the vNF; and
   providing the suggested adjustment to the amount of resources provisioned for the vNF to a resource re-allocator component, wherein the resource re-allocator component is configured to determine a resource re-allocation scheme based on the suggested adjustment to the amount of resources provisioned for the vNF and cause an adjustment to the amount of resources provisioned for the vNF according to the resource re-allocation scheme.

2. The method of claim 1, wherein the vNF includes a plurality of vNF components, and wherein the suggested adjustment obtained from the autoscale ML system includes a suggested adjustment to an amount of resources provisioned per vNF component of the vNF.

3. The method of claim 1, wherein the suggested adjustment obtained from the autoscale ML system and provided to the resource re-allocator component includes an urgency flag, wherein the urgency flag indicates whether a need for resource adjustment is urgent.

4. The method of claim 1, wherein the suggested adjustment obtained from the autoscale ML system indicates any one of a suggested adjustment to an amount of central processing unit (CPU) resources provisioned for the vNF, a suggested adjustment to an amount of memory provisioned for the vNF, and a suggested adjustment to an amount of bandwidth provisioned for the vNF.

5. A method by a computing device to optimize resource usage of service function chains (SFCs) in a network using machine learning, the computing device coupled to a resource monitoring and management system, the method comprising:
   receiving a request to provision an SFC;
   providing a description of the SFC as an input to a resource usage machine learning (ML) system, wherein the resource usage ML system has been previously trained using machine learning to learn an amount of resources utilized by previous SFCs provisioned in the network, and wherein the resource usage ML system is configured to receive as input the description of the SFC, determine using machine learning a suggested amount of resources to provision for the SFC based on the input, and output the suggested amount of resources to provision for the SFC;
   obtaining, from the resource usage ML system, the suggested amount of resources to provision for the SFC; and
   providing the suggested amount of resources to provision for the SFC to a resource allocator component, wherein the resource allocator component is configured to determine a resource allocation scheme based on the suggested amount of resources to provision for the SFC and cause the SFC to be provisioned in the network according to the resource allocation scheme;
   comparing the suggested amount of resources to provision for the SFC with an actual resource usage of the SFC; and
   providing a result of the comparison as error feedback to the resource usage ML system, wherein the resource usage ML system is further trained using the error feedback.

6. The method of claim 5, wherein the suggested amount of resources to provision for the SFC includes any one of a suggested amount of central processing unit (CPU) resources to provision for the SFC, a suggested amount of memory to provision for the SFC, and a suggested amount of bandwidth to provision for the SFC.

7. The method of claim 5, wherein the description of the SFC includes an indication of end points of the SFC and a list of service functions included in the SFC.

8. The method of claim 5, wherein the suggested amount of resources to provision for the SFC includes a suggested amount of resources to provision per service function included in the SFC.

9. A computing device for optimizing resource usage of service function chains (SFCs) in a network using machine learning, the computing device to be coupled to a resource monitoring and management system, the computing device comprising:
   a non-transitory machine-readable storage medium having stored therein an SFC resource optimization component; and
   a set of one or more processors coupled to the non-transitory machine-readable storage medium, the set of one or more processors configured to execute the SFC resource optimization component, the SFC resource optimization component configured to obtain, from an autoscale ML system associated with a virtual network function (vNF), a suggested adjustment to an amount of resources provisioned for the vNF, wherein the autoscale ML system is trained online using machine learning to predict an amount of resources to be utilized by the vNF, and wherein the autoscale ML system is configured to receive as input an amount of resources currently utilized by the vNF, an amount of resources currently available to the vNF, and information regarding SFCs that are currently utilizing the vNF, determine using machine learning the suggested adjustment to the amount of resources provisioned for the vNF based on the amount of resources currently utilized by the vNF, the amount of resources currently available to the vNF, and the information regarding SFCs that are currently utilizing the vNF, and output the suggested adjustment to the amount of resources provisioned for the vNF, wherein the autoscale ML system uses the information regarding SFCs that are currently utilizing the vNF to learn a difference in resource consumption by the vNF when a new SFC starts utilizing the vNF, the SFC resource optimization component further configured to provide the suggested adjustment to the amount of resources provisioned for the vNF to a resource re-allocator component, wherein the resource re-allocator component is configured to determine a resource re-allocation scheme based on the suggested adjustment to the amount of resources provisioned for the vNF and cause an adjustment to the amount of resources provisioned for the vNF according to the resource re-allocation scheme.

10. A computing device for optimizing resource usage of service function chains (SFCs) in a network using machine learning, the computing device to be coupled to a resource monitoring and management system, the computing device comprising:
a non-transitory machine-readable storage medium having stored therein an SFC resource optimization component; and
a set of one or more processors coupled to the non-transitory machine-readable storage medium, the set of one or more processors configured to execute the SFC resource optimization component, the SFC resource optimization component configured to receive a request to provision an SFC, provide a description of the SFC as an input to a resource usage machine learning (ML) system, wherein the resource usage ML system has been previously trained using machine learning to learn an amount of resources utilized by previous SFCs provisioned in the network, and wherein the resource usage ML system is configured to receive as input the description of the SFC, determine using machine learning a suggested amount of resources to provision for the SFC based on the input, and output the suggested amount of resources to provision for the SFC, the SFC resource optimization component further configured to obtain, from the resource usage ML system, the suggested amount of resources to provision for the SFC and provide the suggested amount of resources to provision for the SFC to a resource allocator component, wherein the resource allocator component is configured to determine a resource allocation scheme based on the suggested amount of resources to provision for the SFC and cause the SFC to be provisioned in the network according to the resource allocation scheme, the SFC resource optimization component further configured to compare the suggested amount of resources to provision for the SFC with an actual resource usage of the SFC and provide a result of the comparison as error feedback to the resource usage ML system, wherein the resource usage ML system is further trained using the error feedback.

11. A non-transitory machine-readable storage medium having computer code stored therein, which when executed by a set of one or more processors of a computing device, causes the computing device to perform operations for optimizing resource usage of service function chains (SFCs) in a network using machine learning, the computing device to be coupled to a resource monitoring and management system, the operations comprising:
obtaining, from an autoscale machine learning (ML) system associated with a virtual network function (vNF), a suggested adjustment to an amount of resources provisioned for the vNF, wherein the autoscale ML system is trained online using machine learning to predict an amount of resources to be utilized by the vNF, and wherein the autoscale ML system is configured to receive as input an amount of resources currently utilized by the vNF, an amount of resources currently available to the vNF, and information regarding SFCs that are currently utilizing the vNF, determine using machine learning the suggested adjustment to the amount of resources provisioned for the vNF based on the amount of resources currently utilized by the vNF, the amount of resources currently available to the vNF, and the information regarding SFCs that are currently utilizing the vNF, and output the suggested adjustment to the amount of resources provisioned for the vNF, wherein the autoscale ML system uses the information regarding SFCs that are currently utilizing the vNF to learn a difference in resource consumption by the vNF when a new SFC starts utilizing the vNF; and
providing the suggested adjustment to the amount of resources provisioned for the vNF to a resource re-allocator component, wherein the resource re-allocator component is configured to determine a resource re-allocation scheme based on the suggested adjustment to the amount of resources provisioned for the vNF and cause an adjustment to the amount of resources provisioned for the vNF according to the resource re-allocation scheme.

12. The non-transitory machine-readable storage medium of claim 11, wherein the vNF includes a plurality of vNF components, and wherein the suggested adjustment obtained from the autoscale ML system includes a suggested adjustment to an amount of resources provisioned per vNF component of the vNF.

13. The non-transitory machine-readable storage medium of claim 11, wherein the suggested adjustment obtained from the autoscale ML system and provided to the resource re-allocator component includes an urgency flag, wherein the urgency flag indicates whether a need for resource adjustment is urgent.

14. The non-transitory machine-readable storage medium of claim 11, wherein the suggested adjustment obtained from the autoscale ML system indicates any one of a suggested adjustment to an amount of central processing unit (CPU) resources provisioned for the vNF, a suggested adjustment to an amount of memory provisioned for the vNF, and a suggested adjustment to an amount of bandwidth provisioned for the vNF.

15. A non-transitory machine-readable storage medium having computer code stored therein, which when executed by a set of one or more processors of a computing device, causes the computing device to perform operations for optimizing resource usage of service function chains (SFCs) in a network using machine learning, the computing device to be coupled to a resource monitoring and management system, the operations comprising:
receiving a request to provision an SFC;
providing a description of the SFC as an input to a resource usage machine learning (ML) system, wherein the resource usage ML system has been previously trained using machine learning to learn an amount of resources utilized by previous SFCs provisioned in the network, and wherein the resource usage ML system is configured to receive as input the description of the SFC, determine using machine learning a suggested amount of resources to provision for the SFC based on the input, and output the suggested amount of resources to provision for the SFC;
obtaining, from the resource usage ML system, the suggested amount of resources to provision for the SFC; and providing the suggested amount of resources to provision for the SFC to a resource allocator component, wherein the resource allocator component is configured to determine a resource allocation scheme based on the suggested amount of resources to provision for the SFC and cause the SFC to be provisioned in the network according to the resource allocation scheme;

comparing the suggested amount of resources to provision for the SFC with an actual resource usage of the SFC; and providing a result of the comparison as error feedback to the resource usage ML system, wherein the resource usage ML system is further trained using the error feedback.

16. The non-transitory machine-readable storage medium of claim 15, wherein the suggested amount of resources to provision for the SFC includes any one of a suggested amount of central processing unit (CPU) resources to provision for the SFC, a suggested amount of memory to provision for the SFC, and a suggested amount of bandwidth to provision for the SFC.

17. The non-transitory machine-readable storage medium of claim 15, wherein the description of the SFC includes an indication of end points of the SFC and a list of service functions included in the SFC.

18. The non-transitory machine-readable storage medium of claim 15, wherein the suggested amount of resources to provision for the SFC includes a suggested amount of resources to provision per service function included in the SFC.

* * * * *